Patented June 16, 1931

1,810,239

UNITED STATES PATENT OFFICE

SAMUEL M. DOOLITTLE, OF DECKER, INDIANA

METHOD OF PRODUCING FERTILIZER

No Drawing. Application filed November 11, 1929. Serial No. 406,538.

This invention relates to a composition of matter for use as a fertilizer designed to be prepared by means of the method disclosed in my Patent Number 1,045,130.

It is an object of the invention to improve the quality of the fertilizer by increasing its value as a plant food and also by rendering it valuable as an insecticide.

With the foregoing and other objects in view the invention includes a mixture of 200 pounds of chicken manure with 20 pounds of tobacco stems. With this I also use 100 pounds of wheat bran and 200 pounds of shredded corn fodder. To this mixture are added two percent of ammonia, eight percent of potash and twelve percent phosphoric acid. The foregoing ingredients are combined with enough ordinary manure to make one ton of the material.

It is designed, in practice, to gather together a mass of waste vegetation to be decomposed. Over this mass is laid a layer of lime to expedite the decomposition. The mixture hereinbefore described is deposited on the lime-covered mass and moisture is allowed to seep through it. This will supply the underlying waste material or compost with valuable constituents of the fertilizer such as the ammonia, potash, phosphoric acid, juice from the tobacco stems, and carbonate of lime from the chicken manure. After the compost has thoroughly rotted following the procedure described, the entire mass of material is mixed and thereafter scattered over the surface of the ground and immediately turned under.

It has been found in practice that fertilizer prepared as described supplies much needed humus to the soil in addition to essential plant food. Furthermore the use of the tobacco stems tends to keep away from the growing plants any insects such as borers, lice, etc.

It is to be understood that the compost with the superposed specially prepared fertilizer can be placed in a container when subjected to the action of water. This water is allowed to seep through the mass into a container thereby producing a liquid having pronounced fertilizing properties and which can be used for application to growing plants after the humus produced as heretofore explained has been turned into the soil.

What is claimed is:

The method of producing simultaneously a fertilizer in both solid and liquid form which consists in gathering together a mass of cut weeds and other waste vegetation, placing thereover a covering of quicklime, applying a top covering of stable and chicken manure, tobacco waste, shredded corn fodder and bran mixed with ammonia, potash and phosphoric acid, directing water onto the entire bulk of material from time to time to facilitate disintegration of the mass, and trapping the liquid drained from the mass.

In testimony that I claim the foregoing as my own, I have hereto affixed my signature.

SAMUEL M. DOOLITTLE.